(12) United States Patent
Murata

(10) Patent No.: US 7,035,172 B1
(45) Date of Patent: Apr. 25, 2006

(54) METHOD OF LOGICALLY ERASING CONTENTS OF A CD-RW DISC WHILE PRESERVING DISC ID

(75) Inventor: Morihiro Murata, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 09/665,912

(22) Filed: Sep. 20, 2000

(30) Foreign Application Priority Data

Sep. 20, 1999 (JP) ................................. 11-265506

(51) Int. Cl.
*G11B 5/09* (2006.01)
(52) U.S. Cl. ................................. 369/33.01; 369/47.22
(58) Field of Classification Search .................. 369/82, 369/83, 84, 32, 33.01, 89, 47.22; G11B 5/09
See application file for complete search history.

(56) References Cited

U.S. PATENT DOCUMENTS

| | | | | |
|---|---|---|---|---|
| 5,349,577 A | * | 9/1994 | Mikamo | 369/47.13 |
| 5,506,825 A | * | 4/1996 | Gushima et al. | 369/44.37 X |
| 5,559,778 A | * | 9/1996 | Inokuchi et al. | 369/53.24 |
| 5,561,649 A | * | 10/1996 | Lee et al. | |
| 5,570,340 A | * | 10/1996 | Lee et al. | 369/275.3 |
| 5,659,745 A | * | 8/1997 | Inoue | 707/206 |
| 5,694,381 A | * | 12/1997 | Sako | |
| 5,721,856 A | * | 2/1998 | Takeuchi | 395/401 |
| 5,778,257 A | * | 7/1998 | Tsukatani et al. | 710/4 |
| 5,896,351 A | * | 4/1999 | Misaizu et al. | 369/30.11 |
| 5,940,353 A | * | 8/1999 | Tani | 369/32 |
| 5,940,853 A | * | 8/1999 | Ooi et al. | 711/111 |
| 5,940,854 A | * | 8/1999 | Green et al. | 711/112 |
| 5,966,495 A | * | 10/1999 | Takahashi et al. | 386/68 |
| 6,009,058 A | * | 12/1999 | Sims, III et al. | |

(Continued)

OTHER PUBLICATIONS

Advanced MS-DOS—TM—Expert Techniques for Programmers; Carl Townsend, 1989 first Edition, ISBN -0-672-22667-7 p. 54.*

*Primary Examiner*—A M Psitos
(74) *Attorney, Agent, or Firm*—Pillsbury Winthrop Shaw Pittman LLP

(57) ABSTRACT

A method is designed to logically erase contents of a CD-RW disc in response to an erase command. The CD-RW disc is optically rewriteable, and has a program area and a PMA area. The program area is recorded with the contents in the form of tracks. The PMA area is recorded with at least two kinds of frames, one kind of frames containing identification information for identifying the CD-RW disc and the other kind of frames containing track information for indicating the tracks of the contents recorded in the program area. The method is carried out by the steps of accessing to the PMA area in response to the erase command, deleting all of frames which contain the track information from the PMA area, thereby logically erasing all of the contents from the program area, and reserving frames which contain the identification information in the PMA area, so that the CD-RW disc can be identified at rewriting thereof even after all of the contents are logically erased from the program area of the CD-RW disc. Specifically, the step of reserving reserves frames containing the identification information at a leading section of the PMA area. Practically, the PMA area is divided into sections by every ten number of frames, and the step of reserving reserves a ten number of frames containing the identification information into a predetermined section of the PMA area so as to fill the predetermined section.

22 Claims, 13 Drawing Sheets

U.S. PATENT DOCUMENTS

| | | | |
|---|---|---|---|
| 6,088,312 A * | 7/2000 | Utsumi | 369/47.11 |
| 6,137,769 A * | 10/2000 | Sawada et al. | 369/275.3 |
| 6,151,281 A * | 11/2000 | Van Der Enden et al. | 369/30.11 |
| 6,154,808 A * | 11/2000 | Nagase et al. | 711/103 |
| 6,282,654 B1 * | 8/2001 | Ikeda et al. | 713/200 |
| 6,370,096 B1 * | 4/2002 | Hashimoto | 369/53.2 |
| 6,621,783 B1 * | 9/2003 | Murata | 369/53.31 |

* cited by examiner

METHOD OF LOGICALLY ERASING CONTENTS OF A CD-RW DISC WHILE PRESERVING DISC ID

BACKGROUND OF THE INVENTION

1. Field of the Invention

The present invention relates to a method for erasing data from a CD-RW (CD rewriteable) disc, and a CD-RW recording apparatus that performs this erasing method, so that information for each CD-RW disc that is stored in the CD-RW recording apparatus or in a host computer connected thereto can be reused even after the CD-RW disc has been blanked.

2. Related Arts

Two methods are available for erasing CD-RW discs by physical erasing or logical erasing. For physical erasing, the method used involves the tracing of a track using a laser beam that is set at an erasing level and the deletion of bits by restoring the surface of a disk to the original unrecorded state. For logical erasing, a method is used whereby recorded data is overwritten by logic 0 data. Further, two modes are available for the erasure of CD-RW discs: the erasure of an entire disc and the erasure of a last track. To erase an entire disc using the logical erasing method, the entire PMA (Program Memory Area) is logically erased. Otherwise, the entire PMA area and all the read-in area may be erased when a finalizing process has been performed. TOC (Table of Contents) data such as the numbers of tracks (corresponding to music pieces for an audio disc) recorded in the program area of a CD-RW disc, and position information are recorded in the PMA area and the read-in area. When these areas on a CD-RW have been logically erased, a CD-RW recording apparatus determines that no tracks have been recorded on the CD-RW disc, and a new track can be written, beginning at the start position in the program area.

To erase the last track, normally, track information corresponding to the last track is logically erased from the PMA area of a CD-RW that has not been finalized (namely, the read-in area is not in use). In this manner, when the track information corresponding to the last track of a CD-RW disc has been erased, a CD-RW recording apparatus will determine that the CD-RW disc has no last track, and that a new track can be written beginning at the start position for the last track in the program area. Incidentally, by repeatedly performing such a last track erasure, all tracks on a CD-RW disc can be progressively erased beginning from the end track and proceeding backward to the top track.

In addition to information concerning each track, during the recording process, unique disc identification information (a disc ID), which is readable by a CD-RW recording apparatus, is entered in the PMA area of a CD-RW disc. Thus, when a CD-RW disc on which no disk ID has been recorded is loaded into a CD-RW recording apparatus, the apparatus may detect that the disc bears no disc ID. The CD-RW recording apparatus determines that the CD-RW disc has not been registered, and using an arbitrary code, the recording apparatus generates a disc ID and writes the disc ID in the PMA area of the CD-RW disc. Since disc IDs are employed, the information concerning each CD-RW disc can be managed by the CD-RW recording apparatus, or by a host computer that is connected to the recording apparatus. Then, to write data into a CD-RW disc, for example, OPC (Optimum Power Control) is exercised. According to this operation, prior to the actual writing of data to the program area, a preliminary writing process is performed for a PCA (Power Calibration Area) area, the innermost area on a disc, by sequentially changing the recording laser power at different speeds (uni-speed, double speed, etc.) that can be used for the actual recording. Then, the written data are read out to determine the optimum recording laser power that provides the best replay signal characteristic. The initial value of the recording laser power is then set to the obtained value, and the actual recording is begun. The initial value determined for the recording laser power can be repetitively used so long as the same CD-RW recording apparatus performs the data recording for the same CD-RW disc at the same recording speed.

The optimal results (parameters such as the recording speed and the initial recording laser power value, hereinafter referred to as OPC parameters) obtained by the OPC are stored together with the disc ID of the CD-RW disc in the memory (an EEPROM, a flash memory, a hard disk, etc.) of the CD-RW recording apparatus or the host computer. Then, when the CD-RW disc is again loaded into the CD-RW recording apparatus and the disc ID is read from the PMA area, if the disc ID is registered in the memory, the corresponding OPC parameters will be available such that the recording speed and the initial recording laser power value can be automatically set to perform the actual recording. Since this function (called an OPC value memorization function) is employed, the OPC execution time (7 to 15 seconds each time), which is required each time a CD-RW disc is loaded into a CD-RW recording apparatus, can be saved whereby the waiting time before the initiation of the actual recording can be reduced.

However, according to the conventional erasing method, a disc ID is erased at the same time as the PMA area is erased, hence the OPC parameters for a subject CD-RW disc cannot be read and employed, even though the OPC parameters may be stored in the memory of the CD-RW recording apparatus or the host computer, and the OPC must be repeated.

SUMMARY OF THE INVENTION

To resolve this shortcoming of the conventional art, an objective of the present invention is the provision of a CD-RW disc erasure method whereby information, such as OPC parameters that are stored in a CD-RW recording apparatus or in a host computer connected thereto, concerning a CD-RW disc that is to be erased can be reused even after the erasure process has been completed, as well as the provision of a CD-RW recording apparatus that can employ this erasure method.

The inventive method logically erases contents of a CD-RW disc in response to an erase command. The CD-RW disc is optically rewriteable, and has a program area and a PMA area. The program area is recorded with the contents in the form of tracks. The PMA area is recorded with at least two kinds of frames, one kind of frames containing identification information for identifying the CD-RW disc and the other kind of frames containing track information for indicating the tracks of the contents recorded in the program area. The inventive method is carried out by the steps of accessing to the PMA area in response to the erase command, deleting all of frames which contain the track information from the PMA area, thereby logically erasing all of the contents from the program area, and reserving frames which contain the identification information in the PMA area, so that the CD-RW disc can be identified at rewriting thereof even after all of the contents are logically erased from the program area of the CD-RW disc. Specifically, the step of reserving comprises reserving frames which contain the identification information at a predetermined leading section of the PMA area. Practically, the PMA area is divided into sections by every ten number of frames, and the step of reserving comprises reserving a ten number of frames which contain the identification information into the predetermined section of the PMA area so as to fill the predetermined section.

The inventive method logically erases contents of a CD-RW disc in response to an erase command. The CD-RW disc is optically rewriteable and has a program area and a PMA area. The program area is recorded with the contents in the form of tracks. The PMA area is recorded with at least two kinds of frames, one kind of frames containing identification information for identifying the CD-RW disc and the other kind of frames containing track information for indicating the tracks of the contents recorded in the program area. The inventive method is carried out by the steps of accessing to the PMA area in response to the erase command, detecting when the frames containing the identification information are located at a leading section of the PMA area and the frames containing the track information are located in a subsequent section of the PMA area after the leading section, then deleting all of the frames which contain the track information from the PMA area, thereby logically erasing all of the contents from the program area, and reserving the frames which contain the identification information as they are at the leading section of the PMA area, so that the CD-RW disc can be identified at rewriting thereof even after all of the contents are logically erased from the program area of the CD-RW disc.

The inventive method logically erases contents of a CD-RW disc in response to an erase command. The CD-RW disc is optically rewriteable, and has a program area and a PMA area. The program area is recorded with the contents in the form of tracks. The PMA area is recorded with at least two kinds of frames, one kind of frames containing identification information for identifying the CD-RW disc and the other kind of frames containing track information for indicating the tracks of the contents recorded in the program area. The inventive method is carried out by the steps of accessing to the PMA area in response to the erase command, detecting when first frames containing the identification information are located at a part of a leading section of the PMA area and second frames containing the track information are located after the first frames in the PMA area, then deleting all of the second frames so as to logically erase all of the contents from the program area, and reserving the first frames in the leading section of the PMA area while filling the leading section by the first frames to complete the leading section, so that the CD-RW disc can be identified at rewriting thereof even after all of the contents are logically erased from the program area of the CD-RW disc.

The inventive method logically erases contents of a CD-RW disc in response to an erase command. The CD-RW disc is optically rewriteable, and has a program area and a PMA area. The program area is recorded with the contents in the form of tracks. The PMA area is divided into a leading section and subsequent sections, and is recorded with at least two kinds of frames, one kind of frames containing identification information for identifying the CD-RW disc and the other kind of frames containing track information for indicating the tracks of the contents recorded in the program area. The inventive method is carried out by the steps of accessing to the PMA area in response to the erase command, detecting when first frames containing the identification information are located at a subsequent section of the PMA area and when second frames containing the track information are located in either of the leading section and the subsequent sections except for that containing the first frames, then deleting all of the second frames so as to logically erase all of the contents from the program area, and reserving the first frames in the leading section of the PMA area by copying the first frames from the subsequent section while deleting the first frames from the subsequent section, so that the CD-RW disc can be identified at rewriting thereof even after all of the contents are logically erased from the program area of the CD-RW disc.

The inventive method logically erases contents of a CD-RW disc having a program area and a PMA area in response to an erase command. The program area is recorded with the contents in the form of tracks. The PMA area is recorded with at least two kinds of frames, one kind of frames containing track information for indicating the tracks of the contents recorded in the program area and the other kind of frames containing identification information for identifying the CD-RW disc. The inventive method is carried out by the steps of accessing to the PMA area in response to the erase command effective to command an erase of the last track from the program area, detecting when frames containing the identification information are located at a succeeding section of the PMA area after a preceding section of the PMA area containing frames corresponding to the last track, then deleting the frames corresponding to the last track from the preceding section so as to logically erase the contents of the last track from the program area, and reserving the frames containing the identification information in the preceding section of the PMA area by copying the frames containing the identification information from the succeeding section while deleting the frames recording the identification information from the succeeding section.

The inventive method is designed for logically erasing contents of a CD-RW disc having a program area and a PMA area in response to an erase command. The program area is recorded with the contents in the form of tracks. The PMA area is recorded with at least two kinds of frames, one kind of frames containing track information for indicating the tracks of the contents recorded in the program area and the other kind of frames containing identification information for identifying the CD-RW disc. The PMA area is divided into sections by every ten number of frames. The inventive method is executed by the steps of accessing to the PMA area in response to the erase command effective to command an erase of the last track from the program area, detecting when a five number of frames containing the identification information are located at a section of the PMA area and another five number of frames corresponding to the last track are located in the same section of the PMA area, then deleting the five number of the frames corresponding to the last track from the section so as to logically erase the contents of the last track from the program area, and reserving a ten number of the frames containing the identification information in the section by duplicating the five number of the frames containing the identification information.

The inventive method is designed for logically erasing contents of a CD-RW disc having a program area and a PMA area in response to an erase command. The program area is recorded with the contents in the form of tracks. The PMA area is recorded with at least two kinds of frames, one kind of frames containing track information for indicating the tracks of the contents recorded in the program area and the other kind of frames containing identification information for identifying the CD-RW disc. The PMA area is divided into sections by every ten number of frames. The inventive method is executed by the steps of accessing to the PMA area in response to the erase command effective to command an erase of the last track from the program area, detecting when a five number of frames corresponding to the last track are located in a preceding section and another five number of frames corresponding to a track next to the last track are located in the same preceding section, and a ten number of frames containing the identification information are located at a succeeding section of the PMA area after the preceding section, then deleting the five number of the frames corresponding to the last track from the preceding section so as to logically erase the contents of the last track from the program area, reserving a ten number of the frames corresponding to the track next to the last track by duplicating the five number of the frames corresponding to the track next to the last track, and reserving the ten number of the frames containing the identification information in the succeeding section as they are.

According to the inventive methods of erasing the CD-RW disc, the disc identification information is reserved in the PMA area even after the erasing operation. Such a method enables the reuse of individual information of the identified disc such as OPC parameters stored in a CD-RW drive or a host computer even after the contents of the disc are totally erased.

Some CD-RW drive may automatically write the identification information composed of an ineffective code such as null data into the PMA area. Such an ineffective code cannot identify individual CD-RW discs. In view of this, the inventive method may include the step of deleting the frames recording the identification information instead of the step of reserving the frames recording the identification information when the identification information is ineffective. Alternatively, the step of reserving comprises detecting when the identification information is composed of an ineffective code, and then rewriting the identification information from the ineffective code to an effective code.

The inventive apparatus is constructed for treating contents of a CD-RW disc. In the inventive apparatus, a mount block mounts a CD-RW disc which is optically rewriteable and which has a program area and a PMA area, the program area being recorded with the contents in the form of tracks, the PMA area being recorded with at least two kinds of frames, one kind of frames containing identification information for identifying the CD-RW disc and the other kind of frames containing track information for indicating the tracks of the contents recorded in the program area. An input block inputs an erase command effective to erase all of the contents from the CD-RW disc. A pickup accesses to the PMA area of the mounted CD-RW disc in response to the erase command. A controller block controls the pickup to delete all of frames which contain the track information from the PMA area, thereby logically erasing all of the contents from the program area, and controls the pickup to reserve frames which contain the identification information at a predetermined section of the PMA area, so that the CD-RW disc can be identified at rewriting thereof even after all of the contents are logically erased from the program area of the CD-RW disc.

The inventive apparatus is constructed for logically erasing contents of a CD-RW disc. In the inventive apparatus, a mount block mounts the CD-RW disc having a program area and a PMA area, the program area being recorded with the contents in the form of tracks, the PMA area being recorded with at least two kinds of frames, one kind of frames containing track information for indicating the tracks of the contents recorded in the program area and the other kind of frames containing identification information for identifying the CD-RW disc. An input block inputs an erase command effective to command an erase of the last track from the program area. A pickup accesses to the PMA area in response to the erase command. A controller block controls the pickup to perform a process by the steps of detecting when frames containing the identification information are located at a succeeding section of the PMA area after a preceding section of the PMA area containing frames corresponding to the last track, then deleting the frames corresponding to the last track from the preceding section so as to logically erase the contents of the last track from the program area, and reserving the frames containing the identification information in the preceding section of the PMA area by copying the frames containing the identification information from the succeeding section while deleting the frames containing the identification information from the succeeding section.

DETAILED DESCRIPTION OF THE PREFERRED EMBODIMENTS

Figure 2:
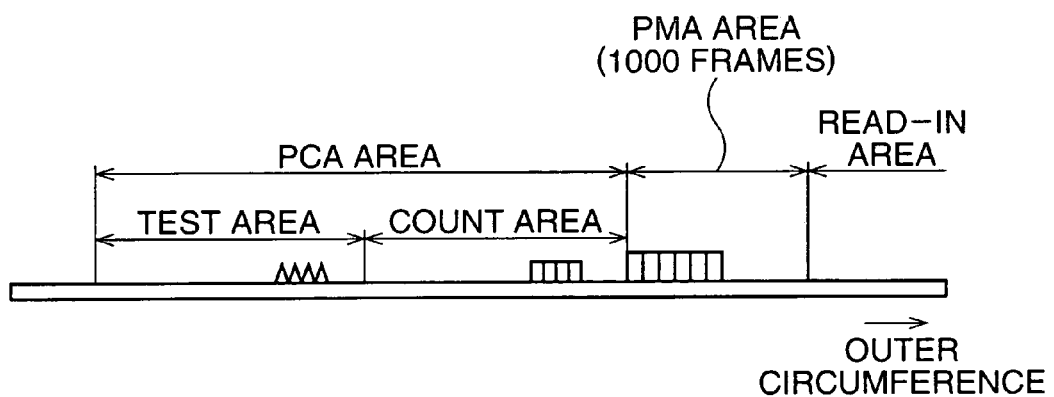
FIG. 2 is a diagram showing a disc format inside the read-in area of a CD-RW disc.

The preferred embodiments of the present invention will now be described. First, an explanation will be given for the format used for a CD-RW disc and the sub-code format used for a PMA area. FIG. 2 is a diagram of the CD-RW disc format, and shows the read-in area of a CD-RW disc and a PMA area. The PMA area is located adjacent to the read-in area, and contains 1000 frames before the starting position for the read-in area. The PMA area records track information every ten frames. A PCA area is located adjacent to the PMA area. The PCA area consists of a count area, in which executed times of OPC operations (100 times at the most) is recorded, and a test area, which is used by the OPC operation to perform preliminary writing.

Figure 3:
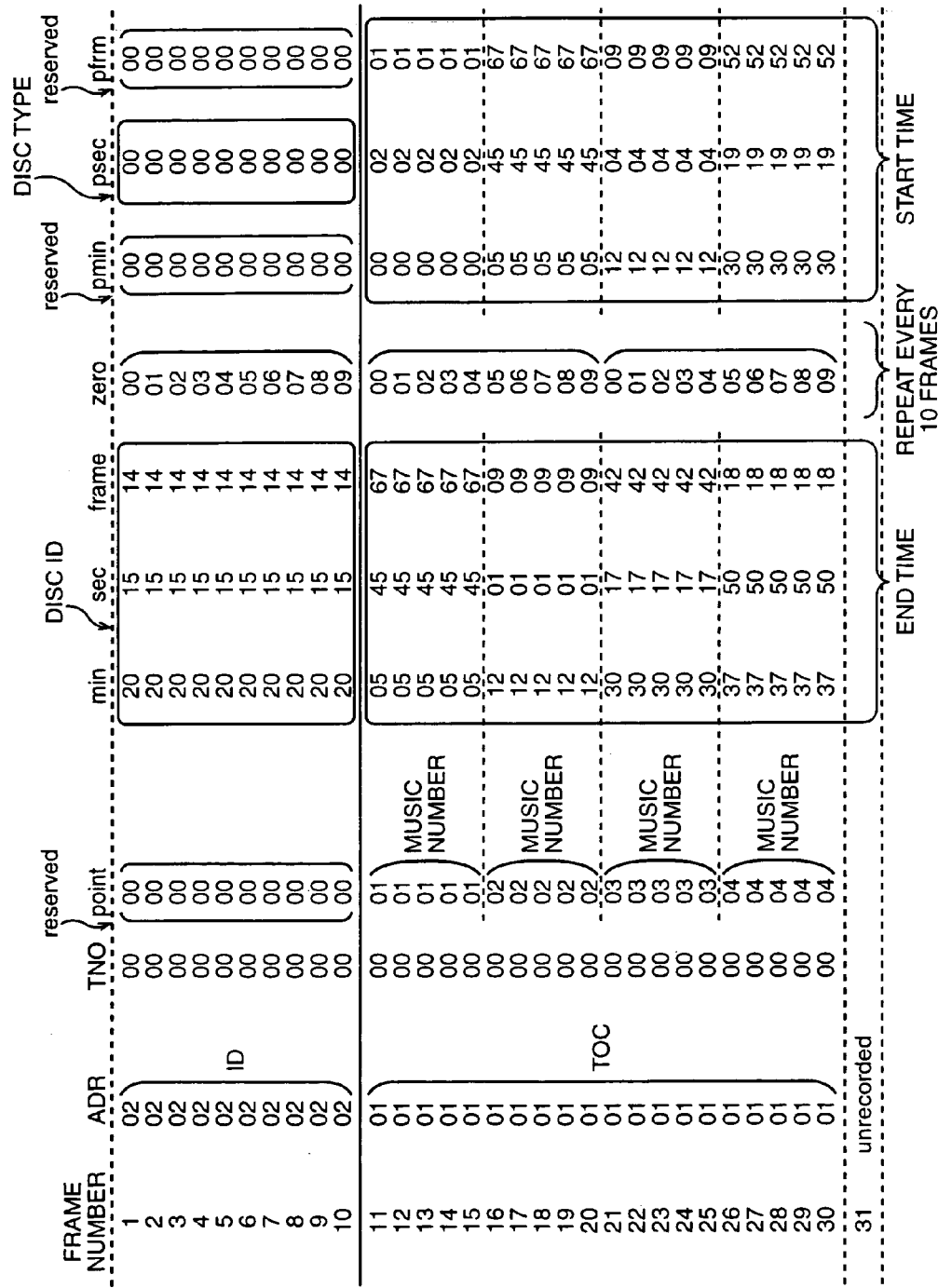
FIG. 3 is a diagram showing an example of Q sub-code data entered in the PMA area of the CD-RW disc.

An example of Q sub-code data stored in the PMA area is shown in FIG. 3. One piece of information is recorded in the PMA area as a set of ten frames, and the same data are repetitively recorded in sections, each consisting of ten frames. The section composed of ten frames may be divided into two subsections each composed of five frames, and different data may be recorded in each subset of five frames. The contents of the Q sub-code data are designated by ADR (address), and ADR=02 (PMA mode 2) indicates the disc ID. In this case, a six-digit number, which is a combination of min, sec and frame, represents the disc ID, and psec represents the disc type (data format type). In other words, psec=00 represents a digital audio or a CD-ROM disc, psec=10 represents a CD-I (CD interactive) disc, and psec=20 represents a CD-ROM XA disc.

ADR=01 (PMA mode 1) represents TOC data of each track that is recorded in the program area. At this time, "point" represents the number of a musical piece; min, sec and frame represent the end time of the musical piece; and pmin, psec and pform represent the start time of the musical piece. The PMA mode 2 data, i.e., the disc ID, are recorded only once (five or ten frames) in the PMA area. Normally, when the CD-RW disc is first loaded into a CD-RW recording apparatus, the disc ID (PMA mode 2 data) is recorded in all ten frames of the first or leading section in the PMA area (or, the first five frames of the leading section). However, some CD-RW recording apparatus do not record the disc ID in the PMA area, and when a CD-RW disc is first loaded into such a CD-RW recording apparatus to record a track, the disc ID is not recorded at the head of the PMA area; instead, the TOC data (PMA mode 1) for the pertinent tracks are recorded. Then, when the recorded CD-RW disc is loaded into another CD-RW recording apparatus that possesses a function for recording the disc ID, it is detected that the disc ID has not yet been recorded, and at this time, the disc ID is recorded following the recording end portion of the PMA area. Therefore, in some cases, the disc ID (PMA mode 2 data) is recorded at a location other than the head or leading section of the PMA area. Furthermore, as was previously described, some CD-RW recording apparatus may always record a default code having fixed value (e.g., all 0s) as the disc ID.

Figure 4:
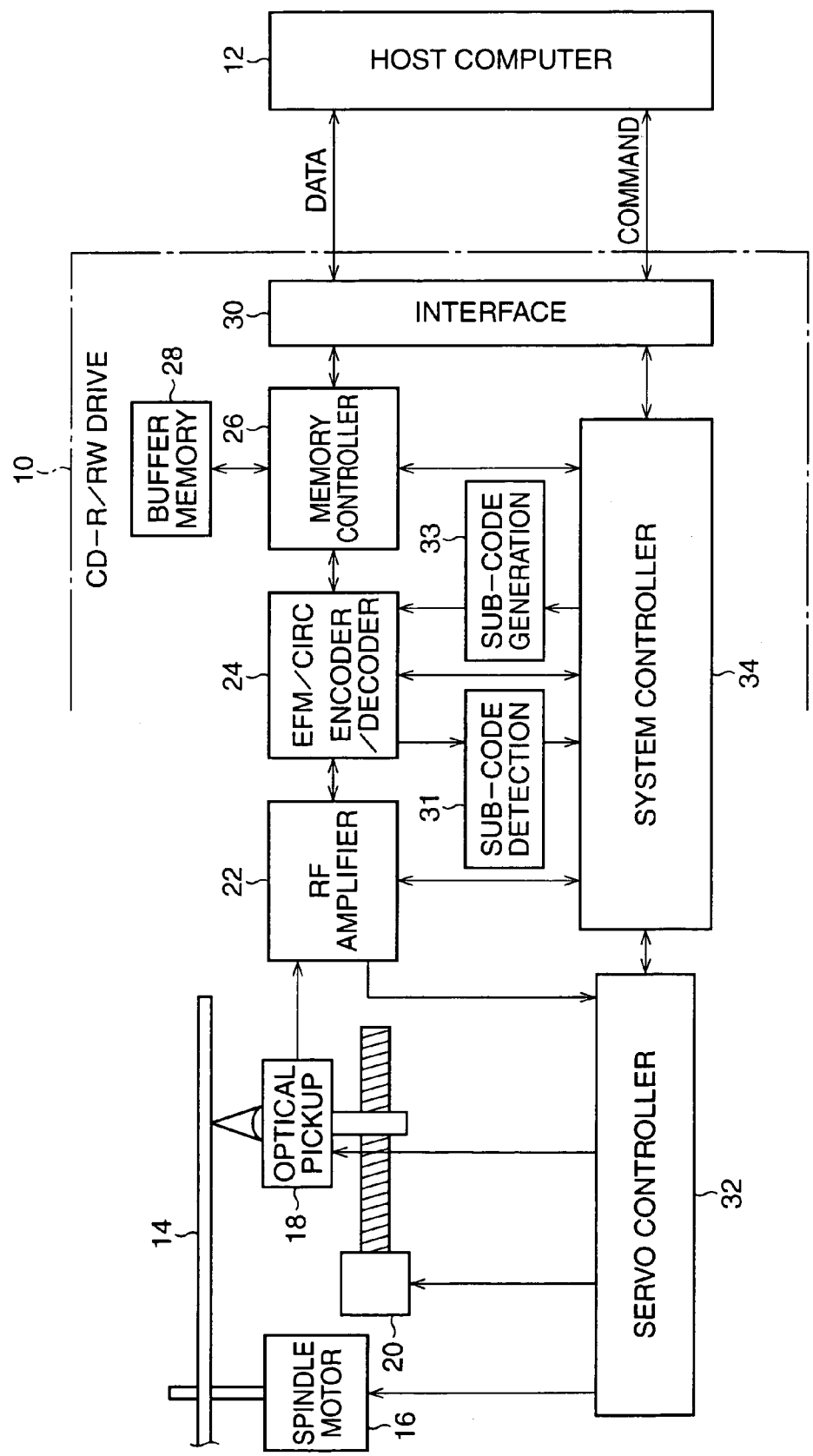
FIG. 4 is a block diagram illustrating the system configuration of a CD-R/RW drive to which the present invention applies.

FIG. 4 is a diagram illustrating the system configuration of an optical disc recording apparatus 10 that can record and reproduce a CD-R disc (CD recordable disc) or a CD-RW disc. An optical disc (CD-R or CD-RW) 14 is mounted on and driven by a mount block containing a spindle motor 16, and information is written into or read from the optical disc 14 by an optical pickup 18. To reproduce data, the optical pickup 18 is moved by a carrying motor 20 along the radius of the optical disc 14. The data read from the optical disc 14 by the optical pickup 18 are then transmitted, via an RF amplifier 22, to an EFM/CIRC encoder/decoder 24, whereat EFM demodulation and error correction are performed. The obtained data are then stored temporarily, by a memory controller 26, in a buffer memory 28. Later, these data are read in accordance with an internal reference clock and jitter is absorbed, and the resultant data are transmitted via an input/output block composed of an interface 30 to a host computer 12. Sub-code contained in the data obtained by the EFM demodulation process is detected by a sub-code detector 31, which also detects the sub-code in the PMA area.

During recording, a recording signal is transmitted from the host computer 12 via the interface 30 and the memory controller 26, and is temporarily stored in the buffer memory 28. These data are read in accordance with the internal clock of the CD-R/RW drive 10, and sub-code generated by a sub-code generator 33 is provided for the data. The sub-code for the PMA area is also generated. The EFM modulation and error correction sign is provided for the resultant data by the EFM/CIRC encoder/decoder 24, and the obtained data transmitted via the RF amplifier 22 are recorded on the optical disc 14 by the optical pickup 18. Based on the output signal of the RF amplifier 22, a servo controller 32 controls the constant linear speed of the spindle motor 16, the focus and tracking of the optical pickup 18, and the carry distance provided by the carrying motor 20. A system controller 34 controls the individual blocks of the CD-R/RW drive 10 and executes instructions and commands inputted from the host computer 12.

Figure 5:
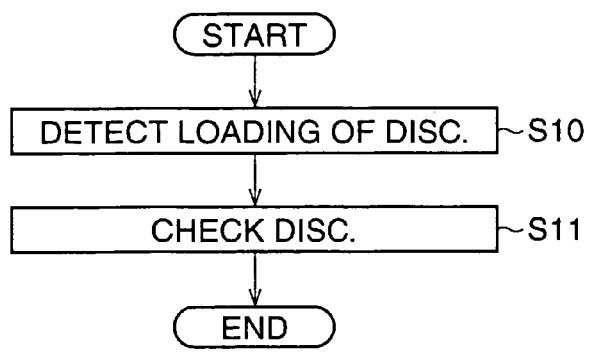
FIG. 5 is a flowchart showing the disc check processing.

The processing performed by the system controller 34 will now be described. In the following explanation, erasing means logical erasing. FIG. 5 is a flowchart for the automatic disc checking process performed when the optical disc 14 is loaded. When the loading and mounting of the optical disc 14 is detected (step S10), the disc checking is performed (step S11). In this case, special ATIP information in the read-in area is employed to determine the disc type (a CD-R disc or a CD-RW disc). Furthermore, all the data recorded in the read-in area and the PMA area are retrieved.

Figure 1:
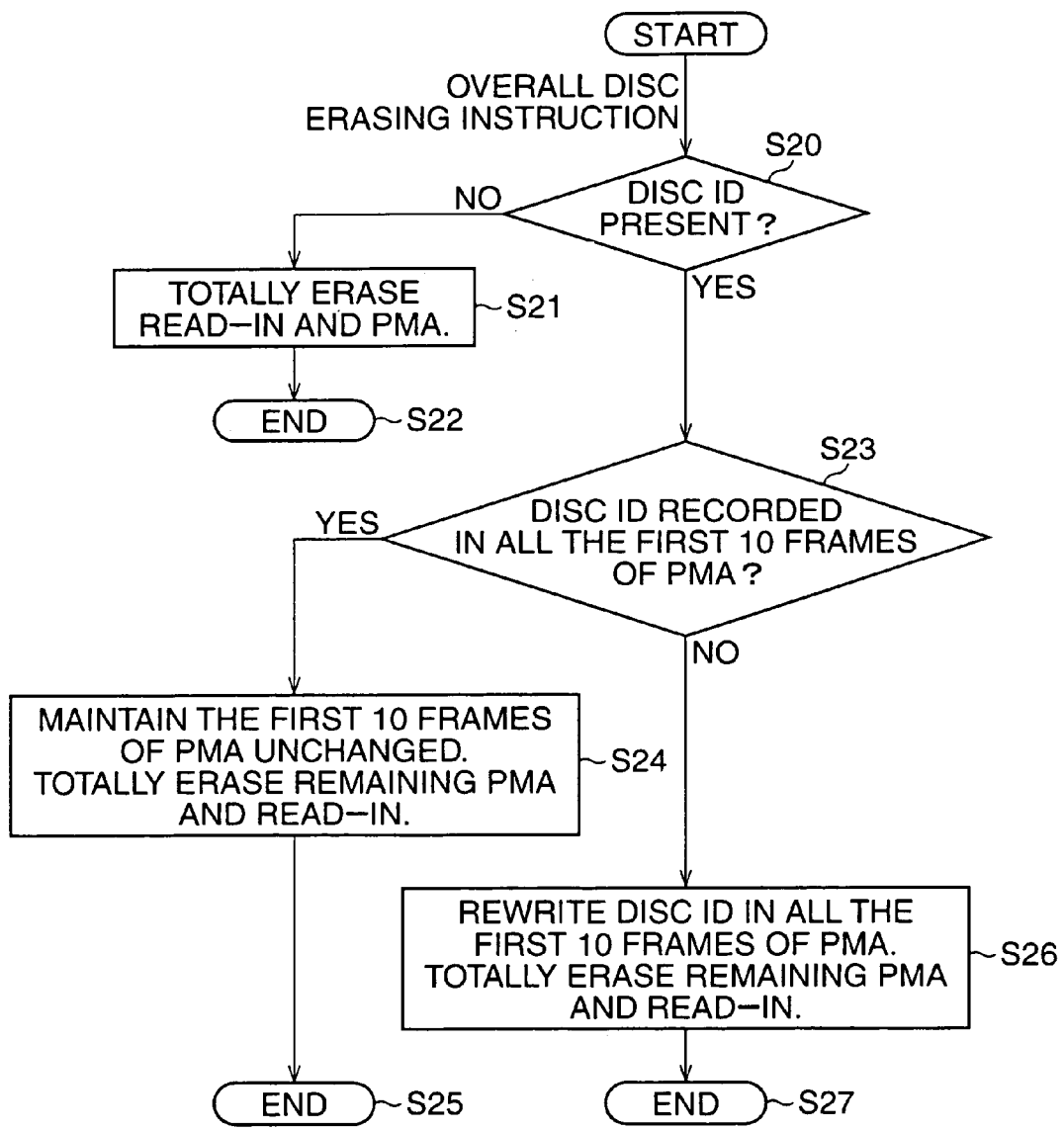
FIG. 1 is a flowchart of the overall processing performed by a disc erasing method in accordance with one embodiment of the present invention.

When the disc checking has been completed, the recording, reproducing or erasing operation can be performed, based on an instruction entered by a user at host computer 12. FIG. 1 is a flowchart showing the control processing performed by the system controller 34 when an erase command for erasing the entire disc is transmitted by the host computer 12. When the erasing of the entire disc is instructed, first, a check is performed to determine whether the disc ID is included in the PMA data (step S20). When the disc ID is not included, all data in the PMA area and the read-in area are erased (step S21) and the erasing processing is terminated (step S22). However, if the disc ID is included in the PMA information, a check is performed to determine whether the disc ID has been recorded in all of the first ten frames in the PMA area (step S23). If yes, the data in these ten frames are maintained unchanged (reserved) and all the data in the remaining PMA area and the read-in area are erased (step S24), and the erasing processing is terminated (further erasure is disabled) (step S25). On the other hand, when the disc ID has not been recorded in all the first ten frames of the PMA area, i.e., when the disc ID has been recorded in none of the ten frames or only in the first five frames or the second five frames, the Q sub-code for the entire first ten frames is regarded as being PMA mode 2 (ADR=02), and the disc ID is written therein, after which all the contents of the remaining PMA area and the read-in area are erased (step S26), and the erasing processing is terminated (further erasing is disabled) (step S27).

Namely, the inventive method logically erases contents of a CD-RW disc in response to an erase command. The CD-RW disc is optically rewriteable, and has a program area and a PMA area. The program area records the contents in the form of tracks. The PMA area contains a sequence of frames which record identification information for identifying the CD-RW disc and track information for indicating the tracks of the contents recorded in the program area. The inventive method is carried out by the steps of accessing to the PMA area in response to the erase command, deleting all of frames which record the track information from the PMA area, thereby logically erasing all of the contents from the program area, and reserving frames which record the identification information at a predetermined section of the PMA area, so that the CD-RW disc can be identified at rewriting thereof after all of the contents are erased from the CD-RW disc. Specifically, the step of reserving comprises reserving frames which record the identification information at a predetermined leading section of the PMA area. Practically, the PMA area is divided into sections by every ten number of frames, and the step of reserving comprises reserving a ten number of frames which record the identification information into the predetermined leading section of the PMA area so as to fill the predetermined leading section.

Figure 6:
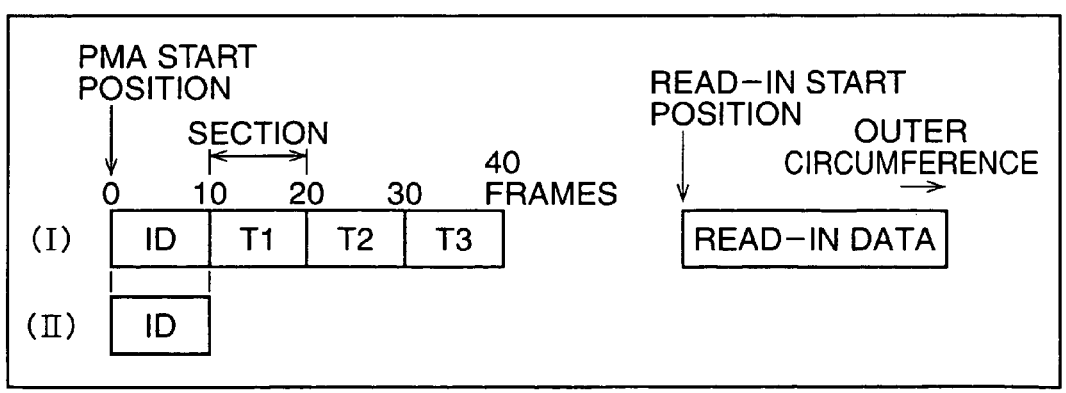
FIG. 6 is a diagram showing an example process used for erasing an entire disk using the inventive disc erasing method.
Figure 7:
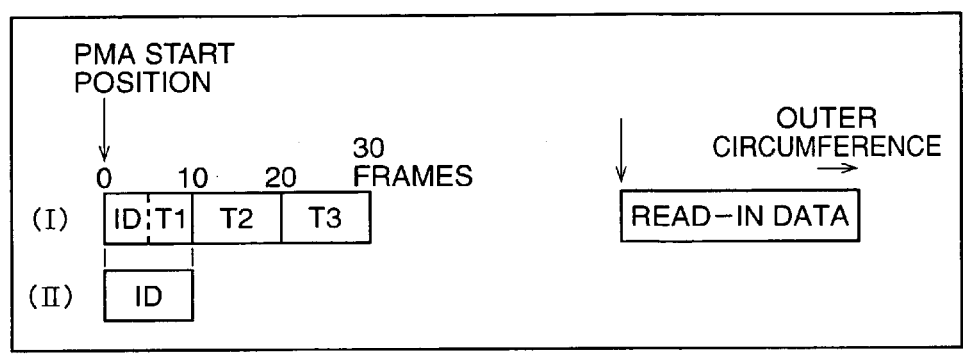
FIG. 7 is a diagram showing another example process used for erasing an entire disk using the disc erasing method.
Figure 8:
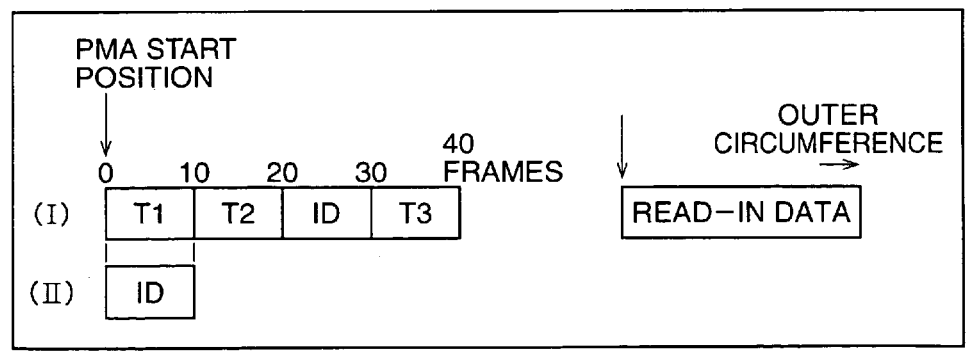
FIG. 8 is a diagram showing an additional example process used for erasing an entire disk using the disc erasing method.

Example processes are illustrated in FIGS. 6 to 8 for the erasing of the entire disk in FIG. 1. In FIGS. 6(I), 7(I) and 8(I) are shown the states before the erasing is performed, and in FIGS. 6(II), 7(II) and 8(II) are shown the states after the erasing is performed. "ID" represents a frame section where the disc ID (PMA mode 2 data) is recorded in the Q-sub code; and "T1," "T2" and "T3" are frame sections where TOC data (PMA mode 1) for tracks 1, 2 and 3 are recorded, respectively. In FIG. 6(I), the disc ID is recorded in the first ten frames of the PMA area, following which the TOC data for tracks 1, 2 and 3 are recorded in order. Then, when the erasing of the entire disc is instructed, the first or leading section of the PMA area is maintained unchanged as is shown in FIG. 6(II), while the contents of the remaining PMA area and the read-in area are all erased. Namely, the inventive method logically erases contents of a CD-RW disc in response to an erase command. The CD-RW disc is optically rewriteable and has a program area and a PMA area. The program area records the contents in the form of tracks. The PMA area contains a sequence of frames which record identification information for identifying the CD-RW disc and track information for indicating the tracks of the contents recorded in the program area. The inventive method is carried out by the steps of accessing to the PMA area in response to the erase command, detecting when the frames recording the identification information are located at a leading section of the PMA area and the frames recording the track information are located in a subsequent section of the PMA area after the leading section, then deleting all of the frames which record the track information from the PMA area, thereby logically erasing all of the contents from the program area, and reserving the frames which record the identification information as they are at the leading section of the PMA area, so that the CD-RW disc can be identified at rewriting thereof after all of the contents are erased from the CD-RW disc.

In FIG. 7(I), the disc ID and the TOC data for track 1 are each recorded in five frames of the first section in the PMA area, following which the TOC data for tracks 2 and 3 are recorded in order. When the erasing of the entire disc is instructed, the disc ID is written over the contents of the frames of the first section as is shown in FIG. 7(II), and all the contents of the remaining PMA area and the read-in area are erased. Namely, the inventive method logically erases contents of a CD-RW disc in response to an erase command. The CD-RW disc is optically rewriteable, and has a program area and a PMA area. The program area records the contents in the form of tracks. The PMA area contains a sequence of frames which record identification information for identifying the CD-RW disc and track information for indicating the tracks of the contents recorded in the program area. The inventive method is carried out by the steps of accessing to the PMA area in response to the erase command, detecting when first frames recording the identification information are located at a part of a leading section of the PMA area and second frames recording the track information are located after the first frames in the PMA area, then deleting all of the second frames so as to logically erase all of the contents from the program area, and reserving the first frames in the leading section of the PMA area while filling the leading section by the first frames to complete the leading section, so that the CD-RW disc can be identified at rewriting thereof after all of the contents are erased from the CD-RW disc.

In FIG. 8(I), the disc ID is recorded in the middle of the PMA area. When the erasing of the entire disc is instructed, the disc ID is written over the contents of the first ten frames as is shown in FIG. 8(II), and all the contents of the remaining PMA area and the read-in area are erased. Namely, the inventive method logically erases contents of a CD-RW disc in response to an erase command. The CD-RW disc is optically rewriteable, and has a program area and a PMA area. The program area records the contents in the form of tracks. The PMA area is divided into a leading section and subsequent sections, and contains a sequence of frames which record identification information for identifying the CD-RW disc and track information for indicating the tracks of the contents recorded in the program area. The inventive method is carried out by the steps of accessing to the PMA area in response to the erase command, detecting when first frames recording the identification information are located at a subsequent section of the PMA area and when second frames recording the track information are located in either of the leading section and the subsequent sections except for that containing the first frames, then deleting all of the second frames so as to logically erase all of the contents from the program area, and reserving the first frames in the leading section of the PMA area by copying the first frames from the subsequent section while deleting the first frames from the subsequent section, so that the CD-RW disc can be identified at rewriting thereof after all of the contents are erased from the CD-RW disc.

Figure 9:
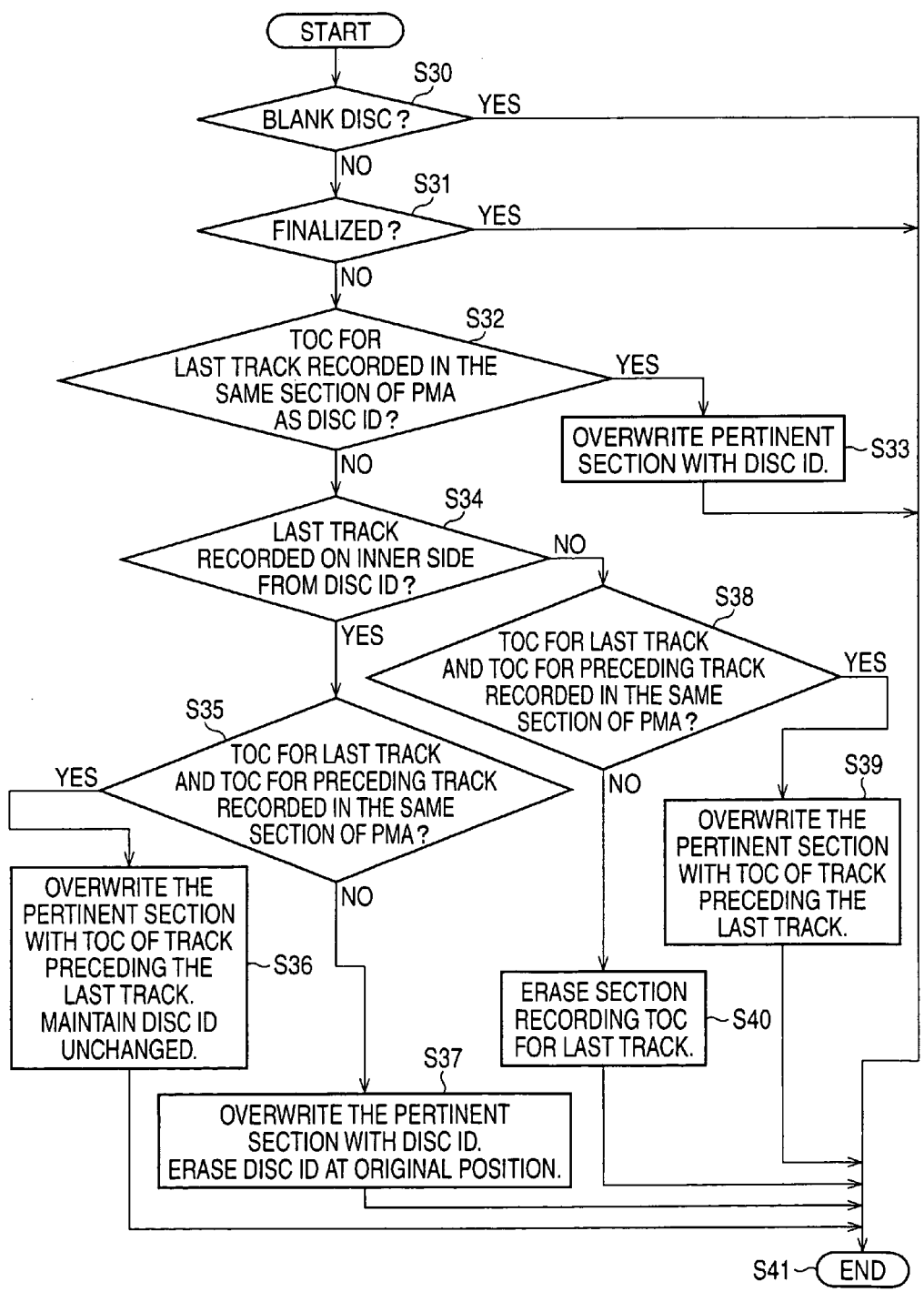
FIG. 9 is a flowchart showing the processing performed by a method for erasing a last track in accordance with the embodiment of the present invention.

FIG. 9 is a flowchart showing the control processing performed by the system controller 34 when the controller receives from the host computer 12 a last track erasing command. When the erasing of the last track is instructed, a check is performed to determine whether the TOC data for a track are recorded in the PMA area, i.e., whether the CD-RW disc is a blank disc (step S30). When the CD-RW disc is a blank disc, the erasing process is immediately terminated (step S41). When the CD-RW disc is not a blank disc, the presence or the absence of the read-in information is detected to determine whether a finalizing process has been performed (step S31). When the finalizing process has been performed, it is assumed that the only choice is the erasing of the entire disk, and the erasing processing is thereafter terminated (step S41). It should be noted, however, that even if the finalizing process has been performed it may be possible to erase the last track by canceling the finalized state (logically erasing the read-in area).

When the finalizing process has not been performed, the disc is examined to determine whether the TOC data for the last track are recorded in five frames of the predetermined ten-frame section in the PMA area that corresponds to the one used for the disc ID (step S32). When the TOC data for the last track are recorded in the same section as the disc ID, the code for the entire section composed of ten frames is regarded as being PMA mode 2 (ADR=02), and the disc ID is used to overwrite the contents of the ten frames (step S33), thereby erasing the last track. When the TOC data for the last track are recorded in a section different from that allocated for the disc ID, a check is performed to determine whether the TOC data for the last track are recorded inside (preceding) or outside (succeeding) the disk ID (step S34). When the TOC data for the last track are recorded inside the disc ID, a further check is performed to determine whether both the TOC data for the last track and the TOC data for a preceding track next to the last track are each recorded in five frames of the same 10-frame section in the PMA area (step S35). When these data are recorded in the same section, the code for the entire section of 10 frames is regarded as being PMA mode 1 (ADR=01), and the TOC data for the track immediately preceding the last track are used to overwrite the ten frames (step S36), thereby erasing the last track, while the section recording the disc ID is maintained unchanged. When the TOC data of the last track and the TOC data of the preceding track are not recorded in the same section, the code for the section where the TOC data for the last track are recorded is regarded as PMA mode 2 (ADR=02), and the disc ID is used to overwrite those ten frames (step S37) and to erase the last track. At this time, the section where the disc ID is originally recorded is erased.

When the TOC data for the last track is recorded in a section succeeding the disc ID, a further check is performed in the PMA area to determine whether both the TOC data for the last track and the TOC data for an immediately preceding track are each recorded in five frames of the same 10-frame section (step S38). When these data are recorded in the same section, the code for the entire section of 10 frames is regarded as being PMA mode 1 (ADR=01) and the TOC data for the track immediately preceding the last track are used to overwrite the ten frames (step S39), thereby erasing the last track. If the TOC information of the last track and the TOC information of the immediately preceding track are recorded in different sections, the TOC information of the last track is simply erased (step S40), thereby deleting the last track. Thereafter, following the erasure of the last track, the immediately preceding track becomes the last track. If another last track erasing command is issued, the erasing of the current last track can be repeated using the above described processing. Subsequently, if all the tracks are erased, no further erasing processing (the erasing of the entire disk or the erasing of the last track) can be performed. Namely, at step S30, it is detected that the CD-RW disc is blank and program control advances to step S41. Therefore, the disc ID is maintained unchanged in the first ten frames of the PMA area.

Figure 10:
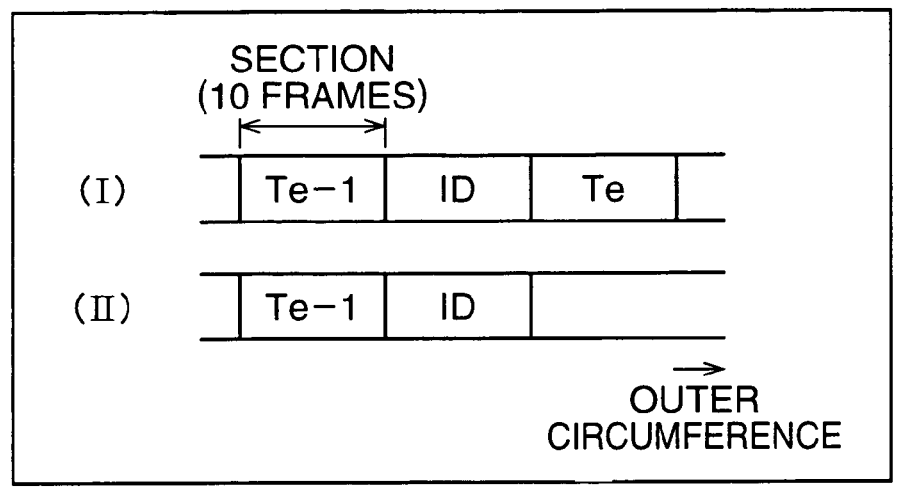
FIG. 10 is a diagram showing an example process performed when a last track is erased using the last track erasing method.

Example processes are shown in FIGS. 10 to 14 for erasing the last track in FIG. 9. In FIGS. 10(I), 11(I), 12(I), 13(I) and 14(I) are shown the states before the erasing is performed, and in FIGS. 10(II), 11(II), 12(II), 13(II) and 14(II) are shown the states after the erasing is performed. "ID" represents a frame section where the disc ID (PMA mode 2) is recorded in the Q sub-code, and "Te," "Te-1" and "Te-2" represent frame sections where the TOC data (PMA mode 1) for the last track, for a first preceding track and for a second preceding track are recorded, respectively. In FIG. 10(I), the TOC data for the last track are recorded in the section immediately succeeding the section in which the disc ID is recorded. When the erasing of the last track is instructed, the section where the TOC data for the last track are recorded is erased as is shown in FIG. 10(II) (corresponding to step S40 in FIG. 9).

Figure 11:
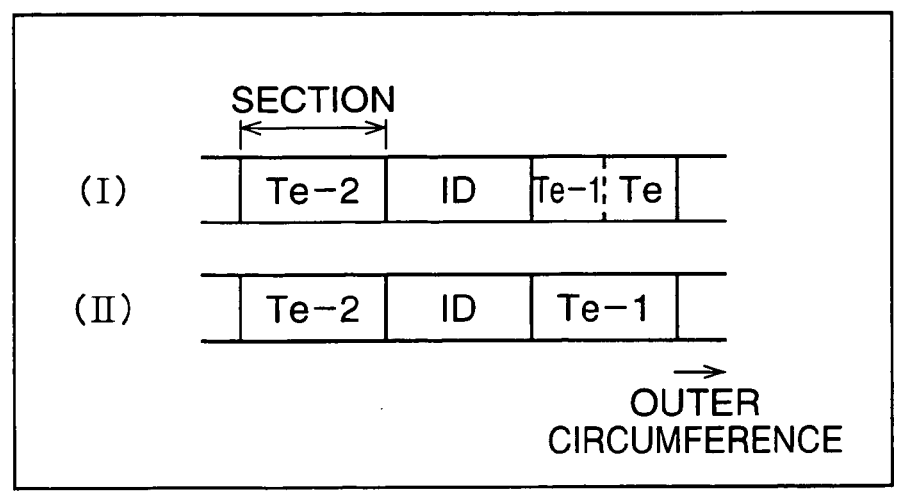
FIG. 11 is a diagram showing another example process performed when a last track is erased using the last track erasing method.

In FIG. 11(I), the TOC data for the last track and the TOC data for the immediately preceding track are each recorded in five frames of the section immediately succeeding the section where the disc ID is recorded. When the erasing of the last track is instructed, the TOC data for the track immediately preceding the last track are used to overwrite the contents of the pertinent section as is shown in FIG. 11(II), so that the TOC data for the last track are erased (corresponding to step S39 in FIG. 9).

Figure 12:
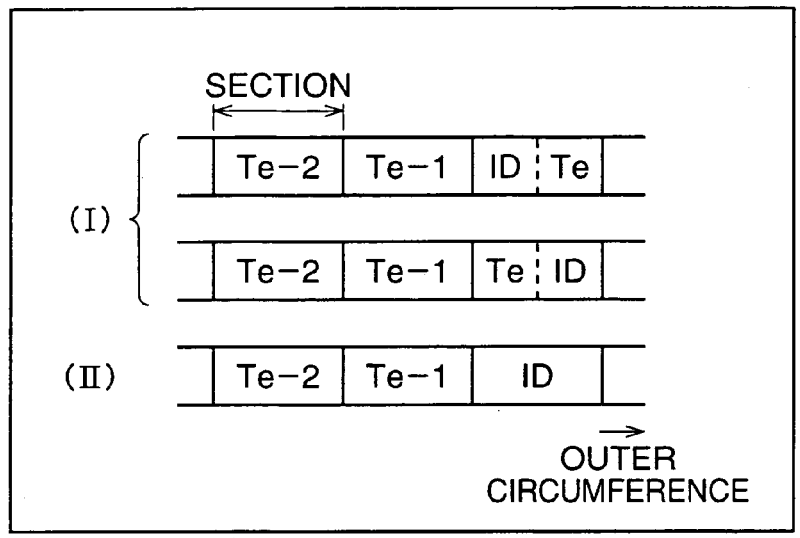
FIG. 12 is a diagram showing an additional example process performed when a last track is erased using the last track erasing method.

In FIG. 12(I), the TOC data for the last track and the disc ID are each recorded in five frames of the same section. Then, when the erasing of the last track is instructed, the disc ID is used to overwrite the entire section as is shown in FIG. 12(II), and at the same time, the TOC data for the last track is erased (corresponding to step S33 in FIG. 9). Namely, the inventive method is designed for logically erasing contents of a CD-RW disc having a program area and a PMA area in response to an erase command. The program area records the contents in the form of tracks. The PMA area contains a sequence of frames which record track information for indicating the tracks of the contents recorded in the program area and which record identification information for identifying the CD-RW disc. The PMA area is divided into sections by every ten number of frames. The inventive method is executed by the steps of accessing to the PMA area in response to the erase command effective to command an erase of the last track from the program area, detecting when a five number of frames recording the identification information are located at a section of the PMA area and another five number of frames corresponding to the last track are located in the same section of the PMA area, then deleting the five number of the frames corresponding to the last track from the section so as to logically erase the contents of the last track from the program area, and reserving a ten number of the frames recording the identification information in the section by duplicating the five number of the frames recording the identification information.

Figure 13:
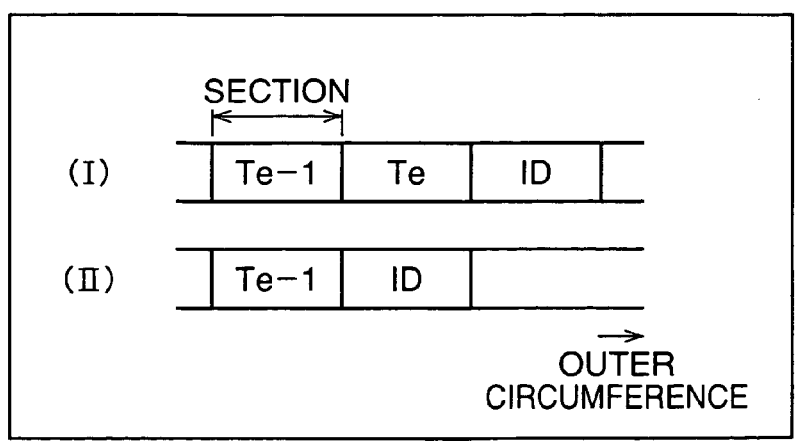
FIG. 13 is a diagram showing one more example process performed when a last track is erased using the last track erasing method.

In FIG. 13(I), the TOC data for the last track are recorded in the immediately adjacent section that is inside the section where the disc ID is recorded. When the erasing of the last track is instructed, the disc ID is used to overwrite the contents of the section where the TOC data for the last track are recorded as is shown in FIG. 13(II), and again, the TOC data for the last track are erased. Furthermore, the section where the disc ID is originally recorded is also erased (corresponding to step S37 in FIG. 9). Namely, the inventive method logically erases contents of a CD-RW disc having a program area and a PMA area in response to an erase command. The program area records the contents in the form of tracks. The PMA area contains a sequence of frames which record track information for indicating the tracks of the contents recorded in the program area and which record identification information for identifying the CD-RW disc. The inventive method is carried out by the steps of accessing to the PMA area in response to the erase command effective to command an erase of the last track from the program area, detecting when frames recording the identification information are located at a succeeding section of the PMA area after a preceding section of the PMA area containing frames corresponding to the last track, then deleting the frames corresponding to the last track from the preceding section so as to logically erase the contents of the last track from the program area, and reserving the frames recording the identification information in the preceding section of the PMA area by copying the frames recording the identification information from the succeeding section while deleting the frames recording the identification information from the succeeding section.

Figure 14:
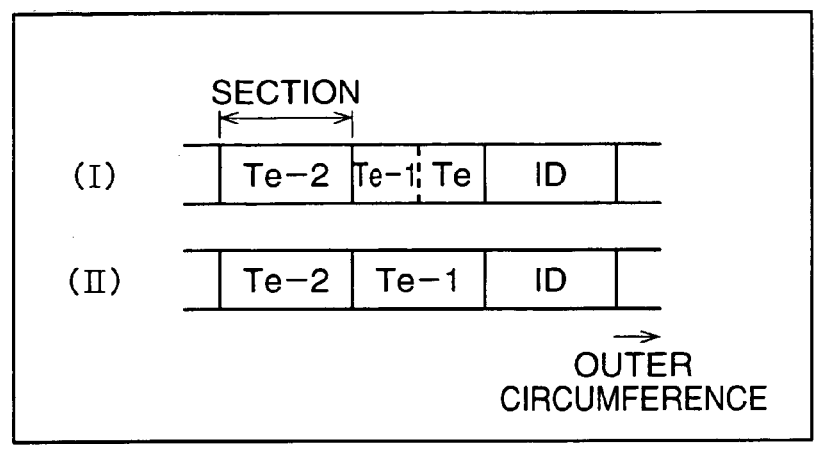
FIG. 14 is a diagram showing yet another example process performed when a last track is erased using the last track erasing method.

In FIG. 14(I), the TOC data for the last track and the TOC data for the immediately preceding track are each recorded in five frames of the immediately adjacent section that is inside the section where the disc ID is recorded. When the erasing of the last track is instructed, the TOC data for the track preceding the last track are used to overwrite all ten frames of the section as is shown in FIG. 14(II), and to thus erase the TOC data for the last track. At this time, the section where the disc ID is recorded is maintained unchanged (corresponding to step S36 in FIG. 9). Namely, the inventive method is designed for logically erasing contents of a CD-RW disc having a program area and a PMA area in response to an erase command. The program area records the contents in the form of tracks. The PMA area contains a sequence of frames which record track information for indicating the tracks of the contents recorded in the program area and which record identification information for identifying the CD-RW disc. The PMA area is divided into sections by every ten number of frames. The inventive method is executed by the steps of accessing to the PMA area in response to the erase command effective to command an erase of the last track from the program area, detecting when a five number of frames corresponding to the last track are located in a preceding section and another five number of frames corresponding to a track next to the last track are located in the same preceding section, and a ten number of frames recording the identification information are located at a succeeding section of the PMA area after the preceding section, then deleting the five number of the frames corresponding to the last track from the preceding section so as to logically erase the contents of the last track from the program area, reserving a ten number of the frames corresponding to the track next to the last track in the preceding section by duplicating the five number of the frames corresponding to the track next to the last track, and reserving the ten number of the frames recording the identification information in the succeeding section as they are.

Figure 15:
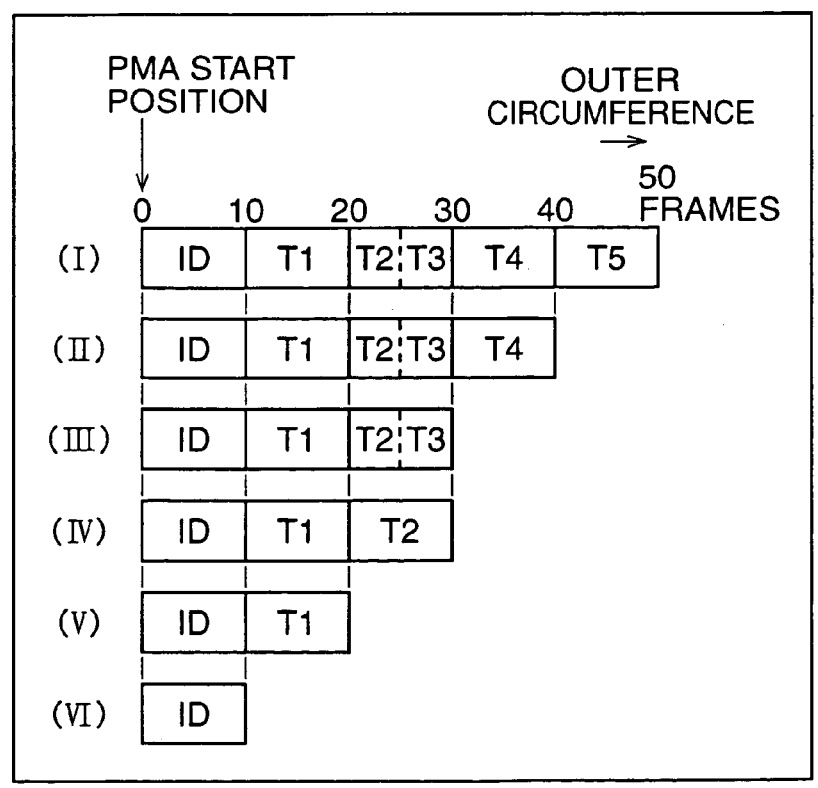
FIG. 15 is a diagram showing an example process performed to erase a last track, using the last track erasing method, when the instruction for the erasure of the last track is repetitively issued.
Figure 16:
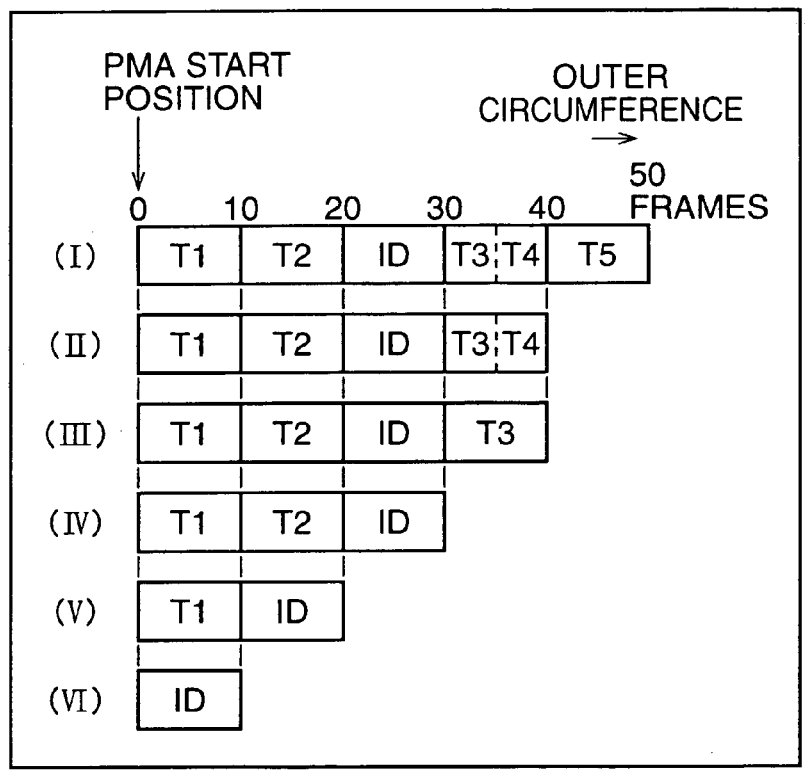
FIG. 16 is a diagram showing another example process performed to erase a last track, using the last track erasing method, when an instruction for the erasure of the last track is repetitively issued.
Figure 17:
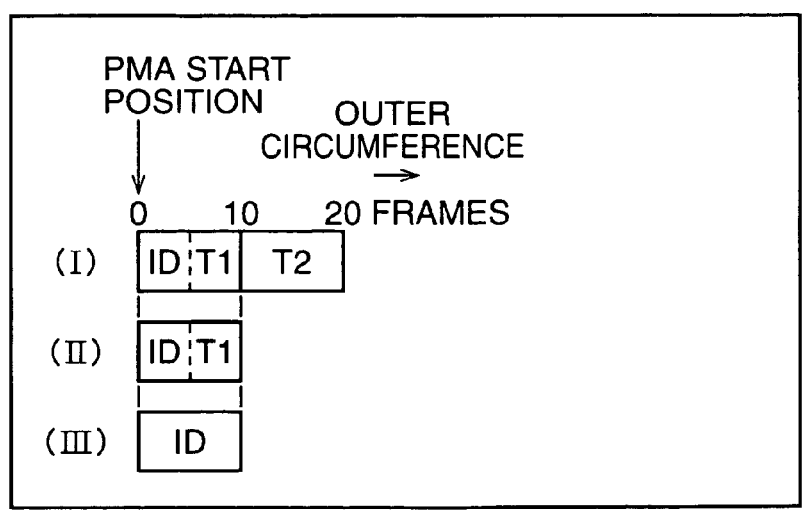
FIG. 17 is a diagram showing other example process performed to erase a last track, using the last track erasing method, when an instruction for the erasure of the last track is repetitively issued.

FIGS. 15 to 17 are diagrams showing the states where the erasing of the last track in FIG. 9 is repeated. In FIGS. 15(I), 16(I) and 17(I) are shown the states before the erasing is performed. In FIG. 15(I), the disc ID is recorded in the first section of the PMA area (ID), and following it, the TOC data for tracks 1 to 5 (T1 to T5) are recorded. When the erasing of the last track is instructed, track 5 is erased (FIG. 15(II)). When the erasing of the last track is repetitively instructed, tracks 4 to 1 are erased in the descending order (FIGS. 15(III) to 15(VI). Finally, only the disc ID remains.

In FIG. 16(I), the disc ID is recorded in the central section of the PMA area, and the TOC data for tracks 1 to 5 precede and succeed the central section. When the erasing of the last track is first instructed, track 5 is erased (FIG. 16(II)). Following this, when the erasing of the last track is repetitively instructed, tracks 4 and 3 are erased (FIGS. 16(III) and 16(IV)). Then, when the erasing of the last track is again instructed, the disc ID is used to overwrite the section where the TOC data for track 2 (T2) are recorded (FIG. 16(V)), and when the erasing of the last track is once more instructed, the disc ID is used to overwrite the section where the TOC data for track 1 (T1) are recorded (FIG. 16(IV)).

In FIG. 17(I), the disc ID and the TOC data for track 1 are each recorded in five frames of the first section of the PMA area. Then, when the erasing of the last track is instructed, track 2 is erased (FIG. 17(II)), and when the erasing of the last track is repetitively instructed, the disc ID is used to overwrite the first ten frames (FIG. 17(III)).

Figure 18:
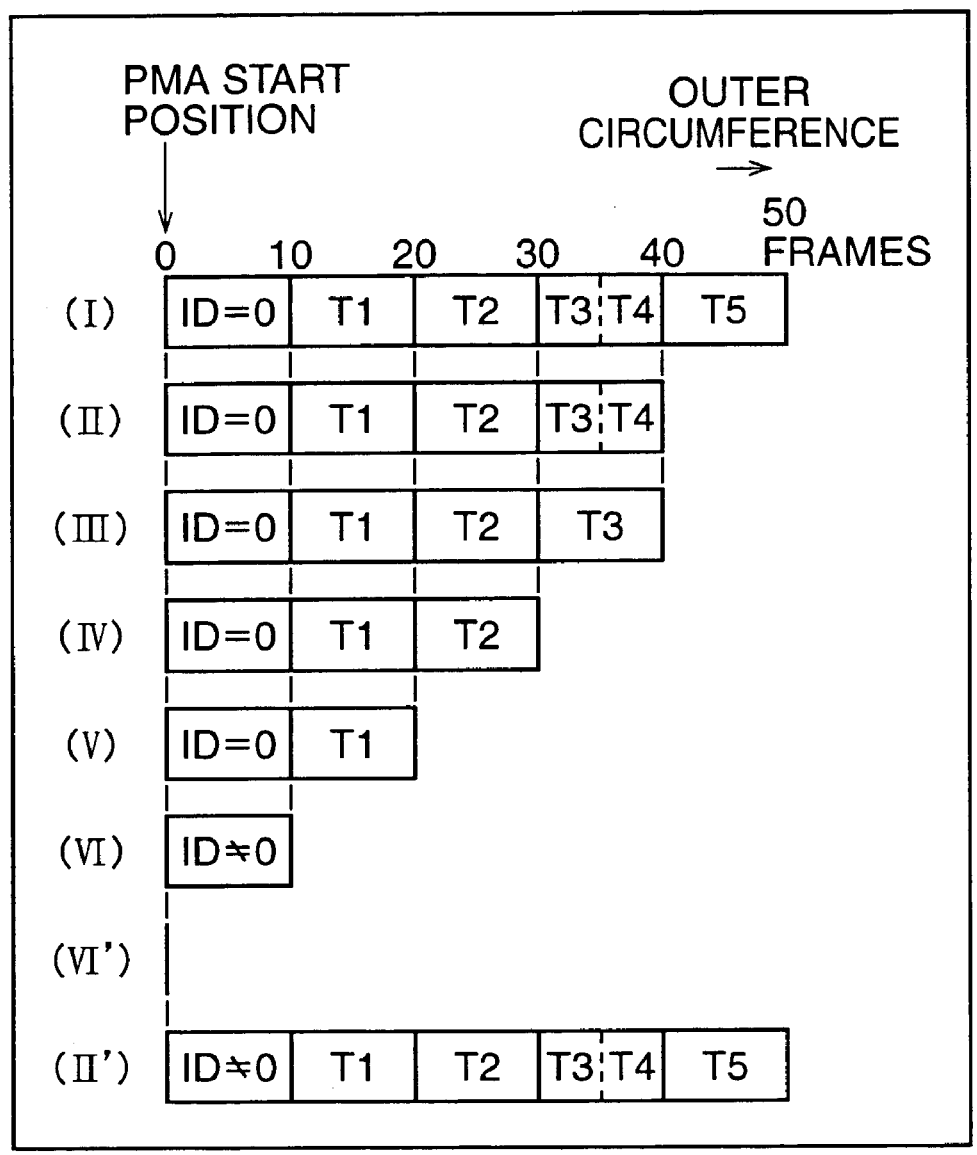
FIG. 18 is a diagram showing the operation performed by the CD-R/RW drive when a CD-RW disc is loaded on which is recorded a disc ID that does not function as a disc ID.

As was previously described, some CD-RW recording apparatus may consistently record a fixed value (e.g., all 0) as a disc ID. Such an ineffective disc ID cannot function as identification information, and therefore, when a CD-RW disc is loaded where an ineffective disc ID has been recorded, the CD-R/RW drive 10 of FIG. 4 performs a special process that will now be described. In the memory (a EEPROM, a flash memory, etc.) of the CD-R/RW drive 10, a disc ID consisting of all 0s is stored in advance as one that cannot function as identification information. FIGS. 18(I) to 18(VI) are diagrams showing an example of the erasing process performed when a CD-RW disc recording the ineffective disc ID is loaded into the CD-R/RW drive 10. In FIG. 18(I) is shown the state before the erasing is performed. In the leading section of the PMA area, a disc ID consisting of all 0s is recorded, followed by the TOC data for tracks 1 to 5. Each time the last track erasing command is inputted, one of the tracks 5 to 1 are erased in the descending order (FIGS. 18(II) to 18(V)). Finally, when track 1 is erased, the disc ID (ID=0) in the first section of the PMA area is overwritten with a disc ID (ID≠0), for which another code is employed that can be used to identify the disc (FIG. 18(VI)). Alternatively, instead of replacing the disc ID (ID=0) recorded in the first section of the PMA area, it may simply be erased (FIG. 18(VI')). Otherwise, when the CD-RW disc recording the specified ineffective disc ID (ID=0) is first loaded, the ineffective disc ID (ID=0) may be overwritten with another effective disc ID (ID≠0) that can be used to identify the disc (FIG. 18(II')). As described, Some CD-RW drive may automatically write the identification information composed of an ineffective code such as null data into the PMA area. Such an ineffective code cannot identify individual CD-RW discs. In view of this, the inventive method may include the step of deleting the frames recording the identification information instead of the step of reserving the frames recording the identification information when the identification information is ineffective. Alternatively, the step of reserving comprises detecting when the identification information is composed of an ineffective code, and then rewriting the identification information from the ineffective code to an effective code.

An explanation will now be given for the exercise of the OPC control and the OPC value memorization process performed by the system configuration shown in FIG. 4. When an optical disc (CD-RW disc) 14 is loaded and mounted into the CD-R/RW drive 10, upon the receipt of an instruction from the host computer 12, OPC control is exercised at the recording speed designated for the actual recording. Then, after the optimal recording power has been obtained by the exercise of the OPC control, and before the disc ID has been recorded, the CD-R/RW drive 10 generates a disc ID, and records it in the PMA area using the obtained optimal recording power. Following this, by issuing a command to the CD-R/RW drive 10, the host computer 12 acquires information that includes OPC parameters such as the disc ID, the recording speed and the optimal recording power value, and stores the information in an internal memory (an EEPROM, a flash memory or a hard disc). The CD-R/RW drive 10 then sets the optimal recording power, and performs the actual recording at the specified recording speed. Following the completion of the actual recording and the unloading of the CD-RW disc 14, the CD-R/RW drive 10 erases the OPC parameters from the internal memory (RAM).

Thereafter, when the CD-RW disc 14 is again loaded into the CD-R/RW drive 10, the CD-R/RW drive 10 reads the disc ID from the PMA area of the CD-RW disk 14, and transmits the disc ID to the host computer 12. Upon receipt of the disc ID, the host computer 12 searches its internal memory (an EEPROM, a flash memory or a hard disc) for the pertinent disc ID. When the disc ID is found, the recording speed and the optimal recording power that are registered for the disc are transmitted to the CD-R/RW drive 10. The CD-R/RW drive 10 then uses the received values to set the initial values of the recording speed and the recording power, and begins the actual recording. After the recording has begun, the optimal recording power fluctuates due to variations in the temperature of the disc substrate, hence the waveform of the return recording laser beam that is detected is employed to exercise real-time OPC control and to apply slight recording power adjustments.

Figure 19:
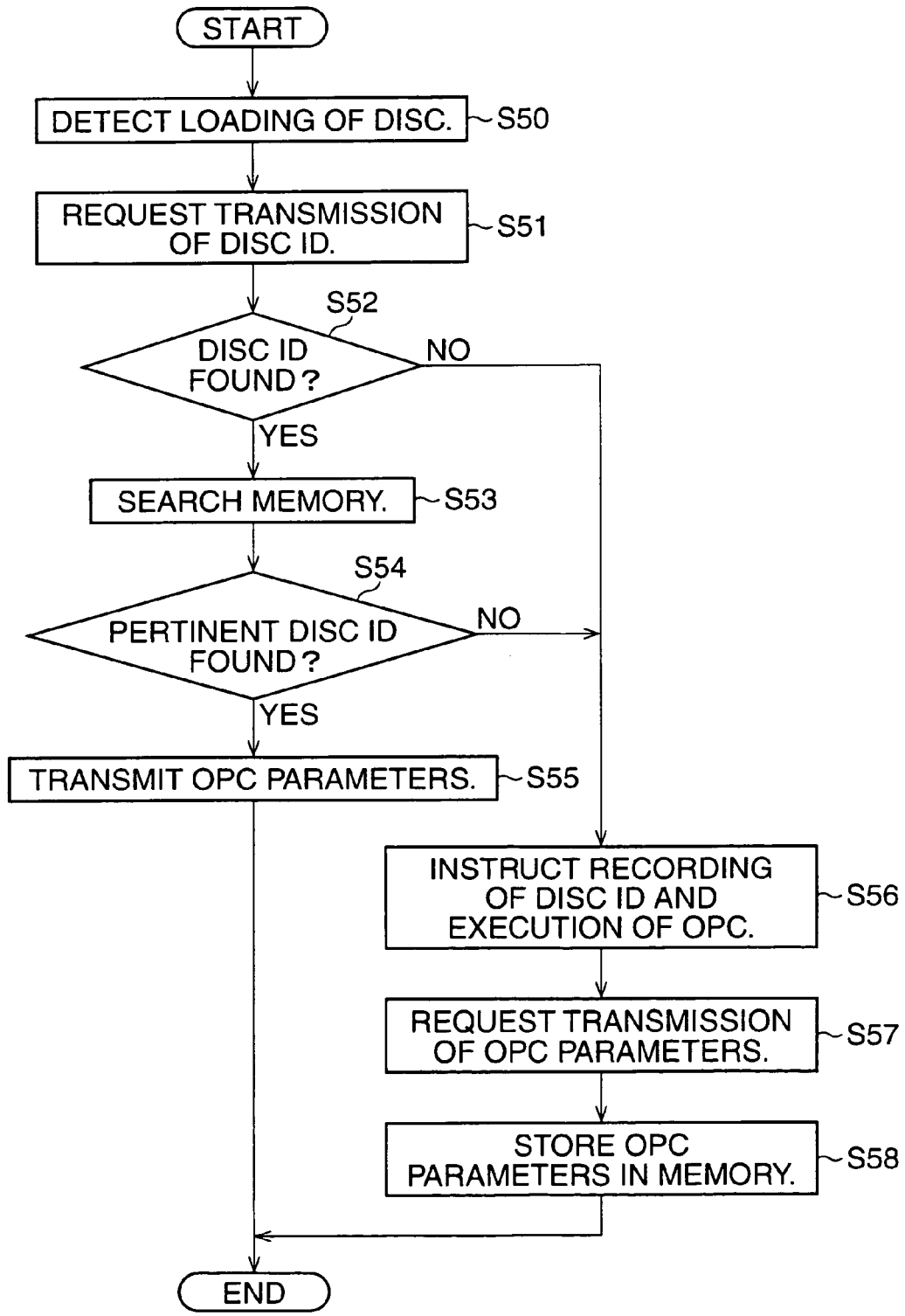
FIG. 19 is a flowchart showing an algorithm that is used by a host computer in order to exercise OPC and to perform OPC value memorization.

FIG. 19 is a flowchart showing the algorithm that is employed by the host computer 12 to exercise the OPC control and to perform the OPC value memorization. When the CD-R/RW drive 10 detects the loading of an optical disc 14 (step S50), the detected data are transmitted to the host computer 12. Upon the receipt of the detected data, the host computer 12 forwards a request to the CD-R/RW drive 10 for the disc ID and for other necessary information (step S51). Subsequently, the host computer 12 examines the data received from the CD-R/RW drive 10 to determine whether the disc ID has been included (step S52). If the disc ID has been included, the host computer 12 searches an internal memory (an EEPROM, a flash memory or a hard disc) (step S53) to determine whether the pertinent disc ID has been registered therein (step S54). If the pertinent disc ID has been recorded, the host computer 12 transmits, to the CD-R/RW dive 10, the data of the recording speed and the optimal recording power that are stored for the disc ID (step S55). The CD-R/RW drive 10 can then employ these data to perform actual recording.

When no disc ID information is included in the data received from the CD-R/RW drive 10, the host computer 12 instructs the CD-R/RW drive 10 to record a disc ID and to exercise the OPC control (step S56). When the exercise of the OPC control has been completed, the host computer 12 requests the CD-R/RW drive 10 to forward the OPC parameters (information concerning the disc ID, the recording speed and the optimal recording power) obtained by exercise of the OPC control (step S57). Upon receipt of the OPC parameters, the host computer 12 stores them in the internal memory (an EEPROM, a flash memory or a hard disc) (step S58). Thereafter, the CD-R/RW drive 10 employs the OPC parameters obtained by exercise of the OPC control to perform actual recording.

In this embodiment, the present invention has been applied to a CD-RW recording apparatus that is connected to a host computer. However, the present invention can also be applied to a standalone type of CD-RW recording apparatus such as an audio CD recorder. Such a CD-RW recording apparatus has a digital input terminal and/or an analog input terminal, and records on a CD-R disc or a CD-RW disc an audio signal received via the input terminal, or reproduces an audio signal read from a CD-R or a CD-RW disc. In this case, an erasing button provided for the CD-RW recording apparatus corresponds to the command input means of this invention. Furthermore, data inherent to a disc, such as the OPC parameters, are recorded in the EEPROM or the flash memory of the CD-RW recording apparatus.

Additionally, the CD-RW disc may be used as a machine readable medium for use in a disc drive or associated computer having a processor or CPU. The medium contains program instructions executable by the processor for causing the disc drive apparatus to perform the inventive erasing method as described above.

What is claimed is:

1. A method of logically erasing contents of a rewritable optical disc in response to an erase command, the rewritable optical disc being optically rewriteable and having a program area and a program memory area (PMA), the program area being recorded with the contents as tracks, the PMA being recorded with at least two kinds of frames, one kind of frames containing identification information for identifying the rewritable optical disc and another kind of frames containing track information for indicating the tracks of the contents recorded in the program area, the method comprising:

accessing the PMA in response to the erase command;
detecting and deleting all of the frames containing the track information from the PMA, thereby logically erasing all of the contents from the program area;
preserving the frames containing the identification information in the PMA, so that the rewritable optical disc can be identified at rewriting thereof even after all of the contents are logically erased from the program area of the rewritable optical disc; and
deleting the frames containing the identification information instead of preserving the frames containing the identification information when the identification information is incapable of identifying the rewritable optical disc.

2. A method of logically erasing contents of a rewritable optical disc in response to an erase command, the rewritable optical disc being optically rewriteable and having a program area and a program memory area (PMA), the program area being recorded with the contents as tracks, the PMA being recorded with at least two kinds of frames, one kind of frames containing identification information for identifying the rewritable optical disc and another kind of frames containing track information for indicating the tracks of the contents recorded in the program area, the method comprising:

accessing the PMA in response to the erase command;
detecting where the frames containing the identification information are located at a leading section of the PMA and the frames containing the track information are located in a subsequent section of the PMA after the leading section;

deleting all of the frames which contain the track information from the PMA, thereby logically erasing all of the contents from the program area;

preserving the frames which contain the identification information as they are at the leading section of the PMA, so that the rewritable optical disc can be identified at rewriting thereof even after all of the contents are logically erased from the program area of the rewritable optical disc; and deleting the frames containing the identification information instead of preserving the frames containing the identification information when the identification information is incapable of identifying the rewritable optical disc.

3. A method of logically erasing contents of a rewritable optical disc in response to an erase command, the rewritable optical disc being optically rewriteable and having a program area and a program memory area (PMA), the program area being recorded with the contents as tracks, the PMA being recorded with at least two kinds of frames, one kind of frames containing identification information for identifying the rewritable optical disc and another kind of frames containing track information for indicating the tracks of the contents recorded in the program area, the method comprising:

accessing the PMA in response to the erase command;

detecting where first frames containing the identification information are located at a part of a leading section of the PMA and where second frames containing the track information are located after the first frames in the PMA;

deleting all of the second frames so as to logically erase all of the contents from the program area;

preserving the first frames in the leading section of the PMA while filling the leading section by the first frames to complete the leading section, so that the rewritable optical disc can be identified at rewriting thereof even after all of the contents are logically erased from the program area of the rewritable optical disc; and deleting the frames containing the identification information instead of preserving the frames containing the identification information when the identification information is incapable of identifying the rewritable optical disc.

4. A method of logically erasing contents of a rewritable optical disc in response to an erase command, the rewritable optical disc being optically rewriteable and having a program area and a program memory area (PMA), the program area being recorded with the contents as tracks, the PMA being divided into a leading section and subsequent sections and being recorded with at least two kinds of frames, one kind of frames containing identification information for identifying the rewritable optical disc and another kind of frames containing track information for indicating the tracks of the contents recorded in the program area, the method comprising:

accessing the PMA in response to the erase command;

detecting where first frames containing the identification information are located at one of the subsequent sections of the PMA and where second frames containing the track information are located in either of the leading section and the subsequent sections except for that containing the first frames;

deleting all of the second frames so as to logically erase all of the contents from the program area; and preserving the first frames in the leading section of the PMA by copying the first frames from the subsequent sections to the leading section while deleting the first frames from the subsequent sections, so that the rewritable optical disc can be identified at rewriting thereof even after all of the contents are logically erased from the program area of the rewritable optical disc.

5. The method according to claim 4, wherein the PMA is divided into sections by every ten number of frames, and wherein the step of preserving comprises reserving a ten number of frames which contain the identification information into the leading section of the PMA so as to fill the leading section.

6. The method according to claim 4, further comprising the step of deleting the frames containing the identification information instead of the step of preserving the frames containing the identification information when the identification information is incapable of identifying the rewritable optical disc.

7. The method according to claim 4, wherein the step of preserving comprises detecting when the identification information is composed of a code incapable of identifying the rewritable optical disc, and then rewriting the identification information from the code incapable of identifying the rewritable optical disc to a code capable of identifying the rewritable optical disc.

8. The method according to claim 4, further including a first mode during which the frames containing the identification information are erased from a first position of the PMA and are then rewritten to the first position of the PMA.

9. The method according to claim 8, further including a second mode during which the frames containing the identification information are erased from the first position of the PMA and are then rewritten to a second position of the PMA, the second position being different than the first position.

10. A method of logically erasing contents of a rewritable optical disc having a program area and a program memory area (PMA) in response to an erase command, the program area being recorded with the contents as tracks, the PMA being recorded with at least two kinds of frames, one kind of frames containing track information for indicating the tracks of the contents recorded in the program area and another kind of frames containing identification information for identifying the rewritable optical disc, the method comprising:

accessing the PMA in response to the erase command effective to command an erase of a last track from the program area;

detecting where frames containing the identification information are located at a succeeding section of the PMA after a preceding section of the PMA containing frames corresponding to the last track;

deleting the frames corresponding to the last track from the preceding section so as to logically erase the contents of the last track from the program area; and preserving the frames containing the identification information in the preceding section of the PMA by copying the frames containing the identification information from the succeeding section while deleting the frames containing the identification information from the succeeding section.

11. The method according to claim 10, wherein the PMA is divided into sections by every ten number of frames, and wherein the step of preserving comprises reserving a ten number of frames which contain the identification information into the preceding section of the PMA so as to fill the preceding section.

12. The method according to claim 10, further comprising the step of deleting the frames containing the identification information instead of the step of preserving the frames containing the identification information when the identification information is incapable of identifying the rewritable optical disc.

13. The method according to claim 10, wherein the step of preserving comprises detecting when the identification information is composed of a code incapable of identifying the rewritable optical disc, and then rewriting the identification information from the code incapable of identifying the rewritable optical disc to a code capable of identifying the rewritable optical disc.

14. A method of logically erasing contents of a rewritable optical disc having a program area and a program memory area (PMA) in response to an erase command, the program area being recorded with the contents as tracks, the PMA being recorded with at least two kinds of frames, one kind of frames containing track information for indicating the tracks of the contents recorded in the program area and another kind of frames containing identification information for identifying the rewritable optical disc, the PMA being divided into sections by every ten number of frames, the method comprising:

accessing the PMA in response to the erase command effective to command an erase of a last track from the program area;

detecting where a five number of frames containing the identification information are located at a section of the PMA and where another five number of frames corresponding to the last track are located in the section of the PMA;

deleting the five number of the frames corresponding to the last track from the section so as to logically erase the contents of the last track from the program area; and preserving a ten number of the frames containing the identification information in the section by duplicating the five number of the frames containing the identification information.

15. The method according to claim 14, further comprising the step of deleting the frames containing the identification information instead of the step of preserving the frames containing the identification information when the identification information is incapable of identifying the rewritable optical disc.

16. The method according to claim 14, wherein the step of preserving comprises detecting when the identification information is composed of a code incapable of identifying the rewritable optical disc, and then rewriting the identification information from the code incapable of identifying the rewritable optical disc to a code capable of identifying the rewritable optical disc.

17. A method of logically erasing contents of a rewritable optical disc having a program area and a program memory area (PMA) in response to an erase command, the program area being recorded with the contents as tracks, the PMA being recorded with at least two kinds of frames, one kind of frames containing track information for indicating the tracks of the contents recorded in the program area and another kind of frames containing identification information for identifying the rewritable optical disc, the PMA being divided into sections by every ten number of frames, the method comprising:

accessing the PMA in response to the erase command effective to command an erase of a last track from the program area;

detecting where a five number of frames corresponding to the last track are located in a preceding section and another five number of frames corresponding to a track next to the last track are located in the preceding section, and a ten number of frames containing the identification information are located at a succeeding section of the PMA after the preceding section;

deleting the five number of the frames corresponding to the last track from the preceding section so as to logically erase the contents of the last track from the program area;

preserving a ten number of the frames corresponding to a track next to the last track in the preceding section by duplicating the five number of the frames corresponding to the track next to the last track; and preserving the ten number of the frames containing the identification information in the succeeding section as they are.

18. The method according to claim 17, comprising the step of deleting the frames containing the identification information instead of the step of preserving the frames containing the identification information when the identification information is incapable of identifying the rewritable optical disc.

19. The method according to claim 17, wherein the step of preserving comprises detecting when the identification information is composed of a code incapable of identifying the rewritable optical disc, and then rewriting the identification information from the code incapable of identifying the rewritable optical disc to a code capable of identifying the rewritable optical disc.

20. An apparatus for logically erasing contents of a rewritable optical disc, comprising:

a mount that mounts the rewritable optical disc having a program area and a program memory area (PMA), the program area being recorded with the contents as tracks, the PMA being recorded with at least two kinds of frames, one kind of frames containing track information for indicating the tracks of the contents recorded in the program area and another kind of frames containing identification information for identifying the rewritable optical disc;

an input that inputs an erase command effective to command an erase of a last track from the program area;

a pickup that accesses the PMA in response to the erase command; and a controller that controls the pickup to perform a process including:

detecting where the frames containing the identification information are located at a succeeding section of the PMA after a preceding section of the PMA containing the frames corresponding to the last track;

deleting the frames corresponding to the last track from the preceding section so as to logically erase the contents of the last track from the program area; and preserving the frames containing the identification information in the preceding section of the PMA by copying the frames containing the identification information from the succeeding section while deleting the frames containing the identification information from the succeeding section.

21. A machine readable medium for use in an apparatus having a processor for logically erasing contents of a rewritable optical disc having a program area and a program memory area (PMA) in response to an erase command, the program area being recorded with the contents as tracks, the PMA being recorded with at least two kinds of frames, one kind of frames containing track information for indicating the tracks of the contents recorded in the program area and another kind of frames containing identification information for identifying the rewritable optical disc, program code stored on the machine readable medium includes instructions to:

access the PMA in response to the erase command effective to command an erase of a last track from the program area;

detect where the frames containing the identification information are located at a succeeding section of the PMA after a preceding section of the PMA containing frames corresponding to the last track;

delete the frames corresponding to the last track from the preceding section so as to logically erase the contents of the last track from the program area; and preserve the frames containing the identification information in the preceding section of the PMA by copying the frames containing the identification information from the succeeding section while deleting the frames containing the identification information from the succeeding section.

22. A method of logically erasing contents of a rewritable optical disc in response to an erase command, the rewritable optical disc being optically rewriteable and having a program area and a program memory area (PMA), the program area being recorded with the contents as tracks, the PMA being recorded with at least two kinds of frames, one kind of frames containing identification information for identifying the rewritable optical disc and another kind of frames containing track information for indicating the tracks of the contents recorded in the program area, the method comprising:

accessing the PMA in response to the erase command;

detecting and deleting all of the frames containing the track information from the PMA, thereby logically erasing all of the contents from the program area; and preserving the frames containing the identification information in the PMA, so that the rewritable optical disc can be identified at rewriting thereof even after all of the contents are logically erased from the program area of the rewritable optical disc, wherein the frames containing the identification information are erasable from the PMA and rewritable to the PMA such that during a second mode the frames containing the identification information are erased from the first position of the PMA and are then rewritten to a second position of the PMA, the second position being different than the first position.

\* \* \* \* \*